United States Patent [19]
Williams et al.

[11] Patent Number: 4,598,544
[45] Date of Patent: Jul. 8, 1986

[54] MEDIUM BYPASS TURBOFAN ENGINE

[75] Inventors: Sam B. Williams, Bloomfield Hills; John F. Jones, Berkley; David K. Dorer, Milford, all of Mich.

[73] Assignee: Williams International Corporation, Walled Lake, Mich.

[21] Appl. No.: 489,530

[22] Filed: Apr. 28, 1983

[51] Int. Cl.⁴ .............................................. F02K 3/02
[52] U.S. Cl. .................................. 60/226.1; 60/262; 60/745
[58] Field of Search ...................... 60/226.1, 262, 745

[56] References Cited

U.S. PATENT DOCUMENTS

| | | | |
|---|---|---|---|
| 2,981,066 | 4/1961 | Johnson | 60/745 X |
| 3,269,119 | 8/1966 | Price | 60/745 |
| 3,375,997 | 4/1968 | Gist, Jr. | 60/226.1 X |
| 3,971,208 | 7/1976 | Schwent | 60/226.1 X |
| 4,038,815 | 8/1977 | Heitmann et al. | 60/745 X |
| 4,112,677 | 9/1978 | Kasmarik | 60/226.1 |

FOREIGN PATENT DOCUMENTS

| | | | |
|---|---|---|---|
| 959695 | 3/1957 | Fed. Rep. of Germany | 60/745 |
| 1101864 | 3/1961 | Fed. Rep. of Germany | 60/745 |
| 2745131 | 4/1979 | Fed. Rep. of Germany | 60/226.1 |

Primary Examiner—J. Casaregola
Assistant Examiner—Donald E. Stout
Attorney, Agent, or Firm—Lyman R. Lyon

[57] ABSTRACT

A medium bypass turbofan engine including a fan mounted on a low pressure shaft and positioned at the inlet of the engine; an intermediate pressure single-stage axial compressor carried by the low pressure shaft and positioned to receive a working airstream portion of the air discharged by the fan; a single-stage high pressure centrifugal compressor positioned to receive the output of the intermediate pressure compressor and carried by a high pressure shaft received telescopically over the low pressure shaft; an annular burner positioned to receive the output of the high pressure compressor; an annular slinger carried by the low pressure shaft and arranged to inject fuel into the burner; a high pressure single-stage axial turbine positioned to receive the output of the burner and carried by the high pressure shaft; and a low pressure multi-stage axial turbine positioned to receive the output of the high pressure turbine and carried by the low pressure shaft.

2 Claims, 5 Drawing Figures

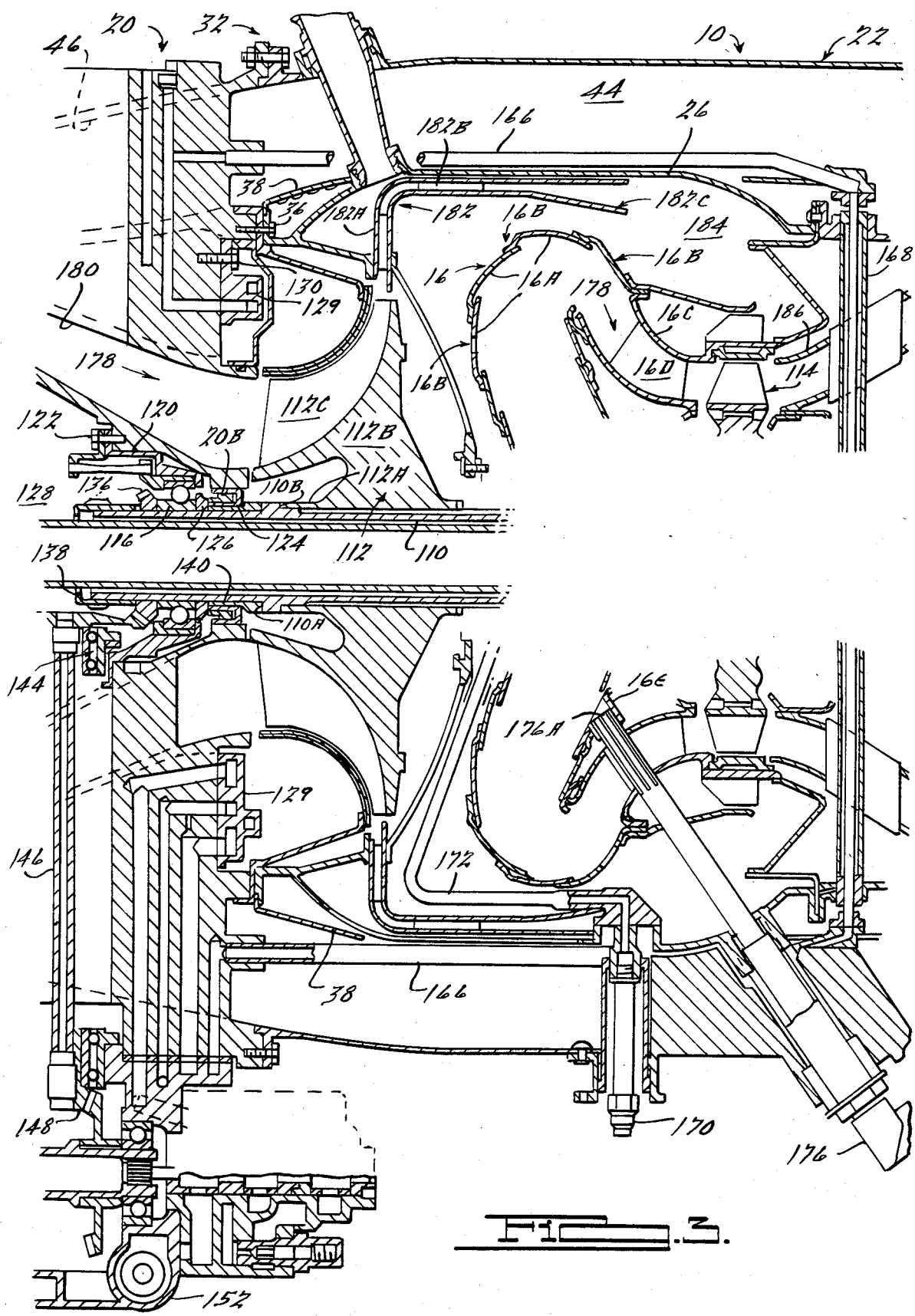

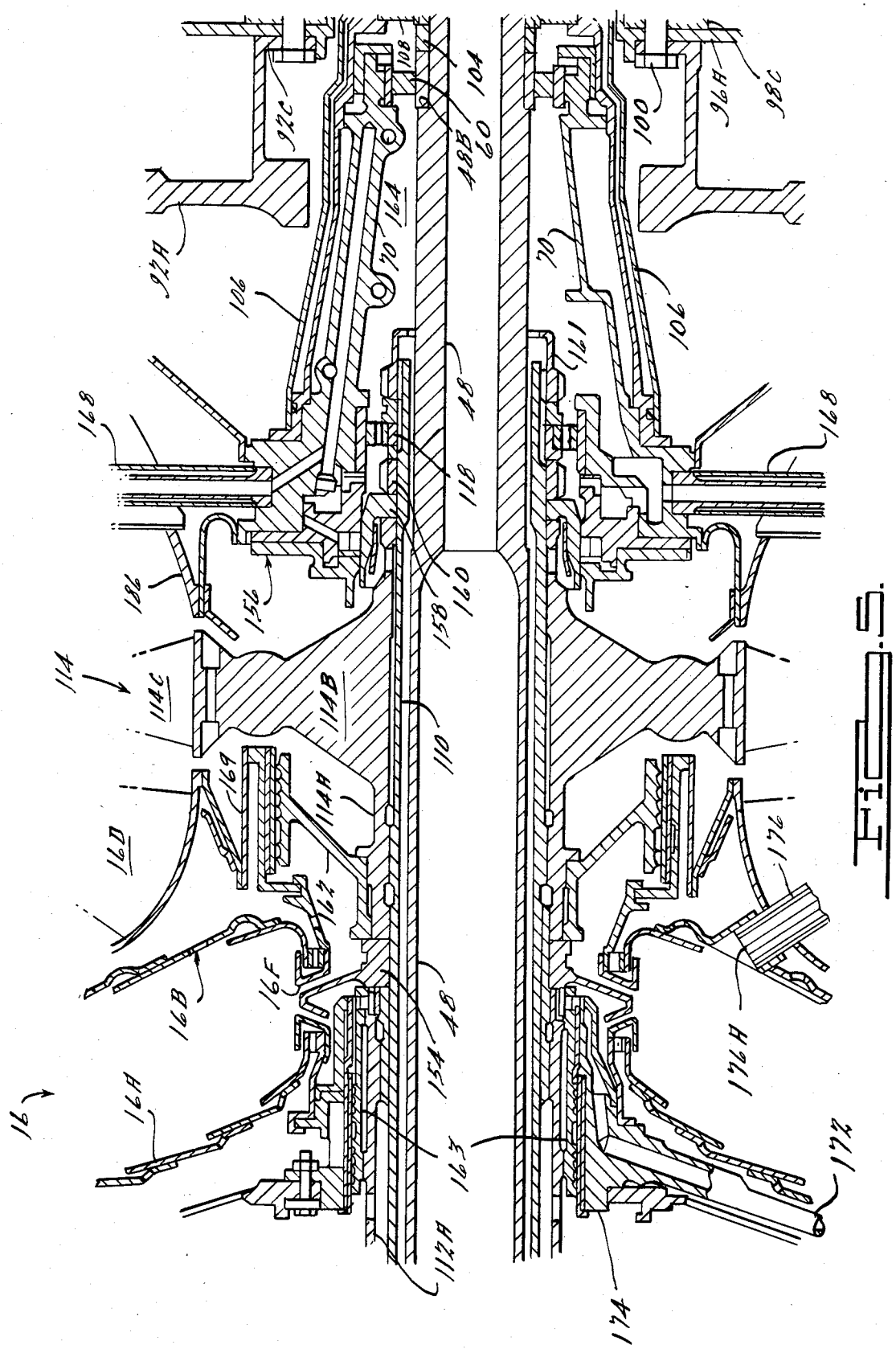

MEDIUM BYPASS TURBOFAN ENGINE

BACKGROUND OF THE INVENTION

This invention relates to gas turbine engines of the turbofan type. More particularly, it relates to a relatively small medium bypass turbofan engine designed for use, for example, as the power plant for business jet aircraft or pilot training jet aircraft.

These applications are extremely competitive and demanding. Success in these applications requires an engine that is compact, simple, lightweight, extremely fuel efficient and that is able to use state-of-the-art moderately priced non-strategic materials. The engine that is successful in these applications must also provide long, trouble-free engine life under the severe duty cycle that is characteristic of these applications.

SUMMARY OF THE INVENTION

The present invention provides a relatively small medium bypass turbofan engine that is compact, simple, lightweight, extremely fuel efficient, relatively inexpensive to produce, and durable. The invention engine is of the type including a generally tubular axially extending housing assembly or nacelle defining a radially outer annular bypass duct extending from the inlet end of the housing assembly to the exhaust end thereof. Ducting means are defined within the housing assembly to deliver a working airstream to various working components of the engine and the discharge of the fan, positioned in the inlet end of the housing assembly, is divided in known manner between the bypass duct and the working airstream. The working components of the engine include an annular burner, a low pressure spool and a high pressure spool.

According to the invention, the fan is part of the low pressure spool which further includes a shaft journaled on the central axis of the housing assembly and a low pressure turbine disposed proximate the discharge end of the housing assembly, and the high pressure spool includes a hollow shaft telescopically received over the shaft of the low pressure spool, a high pressure compressor axially positioned between the fan and the burner, a high pressure turbine axially positioned between the burner and the low pressure turbine, and a rotary slinger positioned on the high pressure shaft axially between the high pressure compressor and the high pressure turbine and arranged to sling fuel radially outwardly into the burner. The working airstream is directed by the ducting means from the fan to the high pressure compressor, from the high pressure compressor to the burner, from the burner to the high pressure turbine, from the high pressure turbine to the low pressure turbine and from the low pressure turbine to the exhaust end of the housing assembly for mixture with the bypass airstream to provide forward thrust.

BRIEF DESRIPTION OF THE DRAWINGS

FIGS. 2–4 are successive longitudinal cross-sectional views of the invention engine, progressing from fore to aft; and FIG. 5 is a longitudinal cross-sectional view of the invention engine showing, in detail and on a somewhat enlarged scale, portions of the central axial section of the engine seen only fragmentarily in FIGS. 3 and 4.

DETAILED DESCRIPTION OF THE PREFERRED EMBODIMENT OF THE INVENTION

Figure 1:
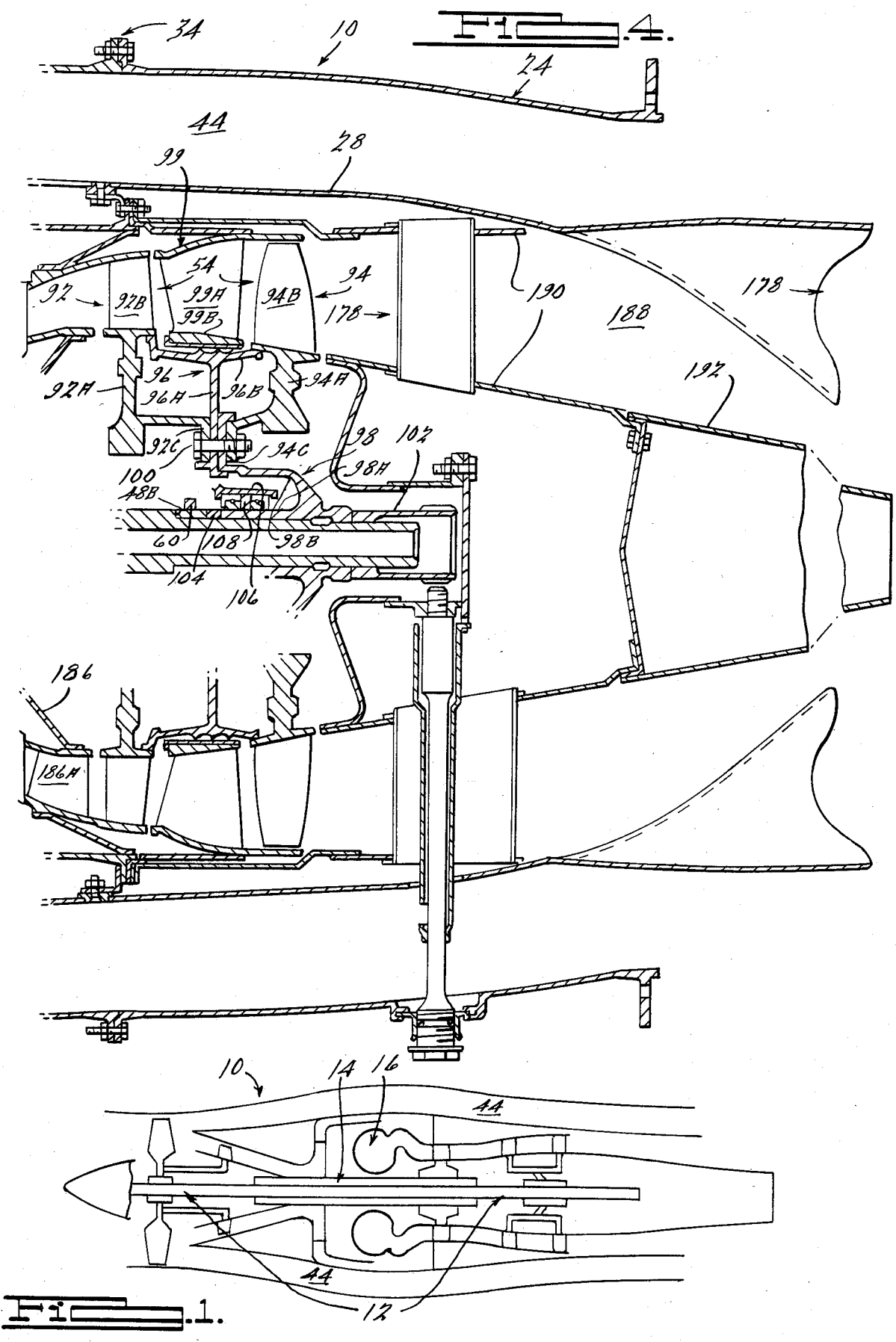
FIG. 1 is a schematic longitudinal cross-sectional view of the invention engine.
Figure 2:
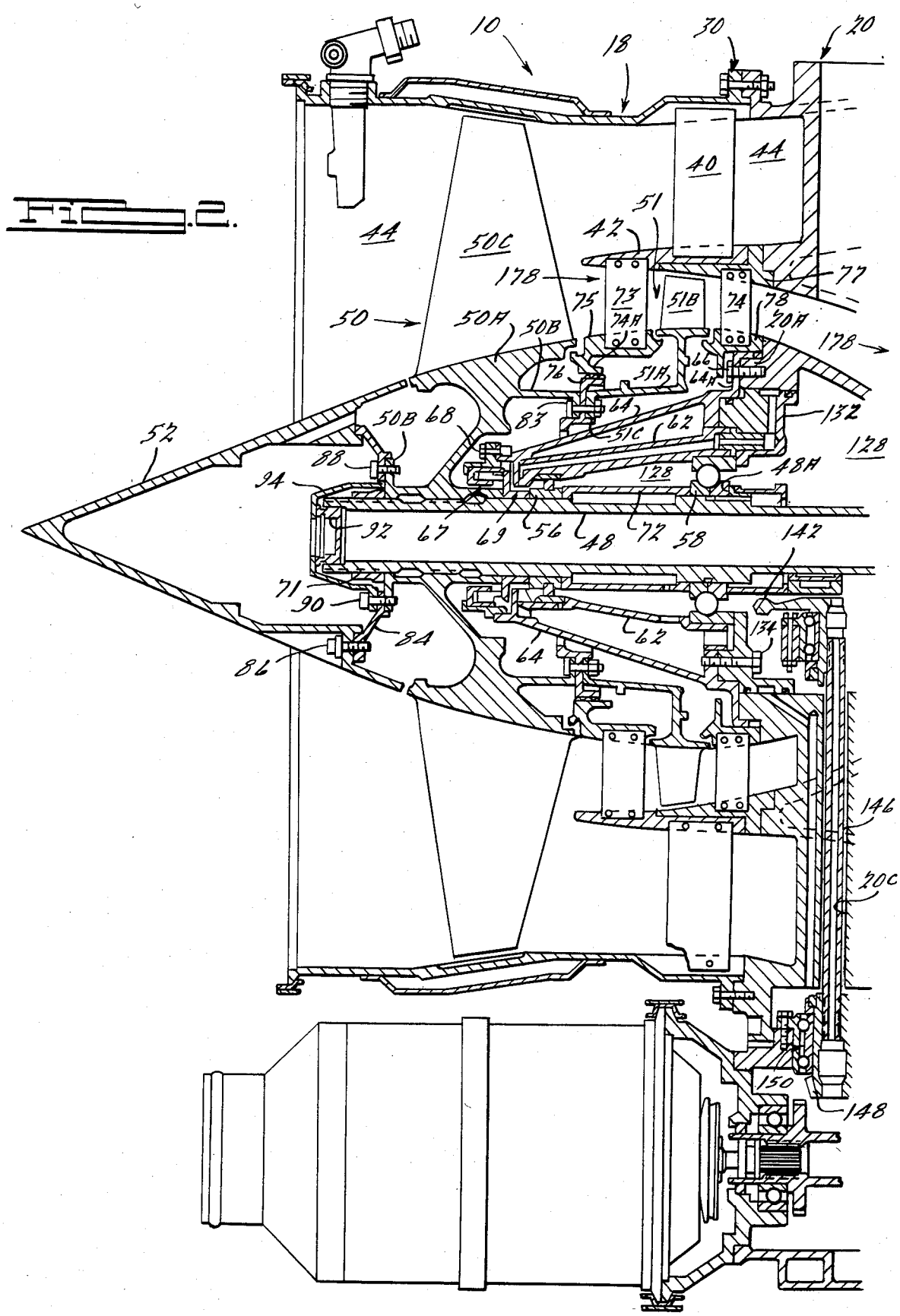

The invention engine broadly considered, and as best seen in FIG. 1, comprises a housing assembly or nacelle seen generally at 10, a low pressure spool assembly seen generally at 12, a high pressure spool assembly seen generally at 14 and a burner seen generally at 16.

Referring now to FIGS. 2–5, housing assembly 10 includes an inlet casing 18, an interstage member 20, a front outer bypass duct 22, a rear outer bypass duct 24, a front inner bypass duct 26, and a rear inner bypass duct 28.

A bolt ring 30 secures the aft annular edge of inlet casing 18 to the forward annular edge of interstage member 20; a second bolt ring 32 secures the aft annular edge of interstage member 20 to the forward annular edge of front outer bypass duct 22; and a third bolt ring 34 secures the aft annular edge of duct 22 to the forward annular edge of rear outer bypass duct 24. The forward annular edge of front inner bypass duct 26 is secured to interstage member 20 by a series of circumferentially spaced bolts 36 and the forward annular edge of front inner bypass duct 26 in turn secures the forward annular edge of an inner bypass duct fairing 38.

A series of circumferentially spaced vanes 40 position a ring member 42 concentrically within the aft section of inlet casing 18. A bypass passage or duct 44, extending from a location proximate the forward end of the engine to the aft end of the engine, is thus successively defined, moving from forward to aft, by the inlet casing 18 and ring member 42, by an annular cored passage 46 in interstage member 20, and by the annular space between outer duct members 22, 24 and inner duct members 38, 26, 28.

Low pressure spool assembly 12 includes a quill shaft 48, a fan 50, and intermediate pressure compressor 51, a nose cone or spinner 52, and a low pressure turbine assembly 54.

Shaft 48 is journaled on the central longitudinal axis of housing assembly 10 by a forward roller bearing 56, a forward ball bearing 58, and an aft roller bearing 60. Forward bearings 56 and 58 are carried by an annular, tapered bearing housing member 62 which in turn is carried within an annular tapered bearing support member 64. Bearing support member 64 includes an annular flange portion 64A by which member 64 is secured to annular inner rib portion 20A of interstage member 20 by a series of circumferentially spaced bolts 66. A carbon face seal assembly 67 is secured to the forward end of bearing support member 62 by bolts 68 and sealingly coacts with a face seal runner 69 carried on shaft 48 immediately forwardly of the inner race of bearing 56. Aft roller bearing 60 is carried at the aft end of an annular tapered bearing housing member 70.

Fan 50 includes a conical hub portion 50A splined onto shaft 48 immediately forwardly of face seal runner 69, a mounting flange portion 50B, and a plurality of fan blade portions 50C spaced circumferentially about hub portion 50A and juxtaposed at their radially outer edges to the inner circumferential surface of inlet casing 18. A spanner nut 71 on the forward end of shaft 48 snugs up fan hub portion 50A, face seal runner 69, the inner race of bearing 56 and a spacer 72 and presses the inner race of bearing 58 against shoulder 48A on shaft 48.

Intermediate compressor 51 includes a main body portion 51A, a plurality of circumferentially spaced vane portions 51B and a mounting flange portion 51C secured by bolts 83 to mounting flange portion 50B of fan 50. Vanes 51B of compressor 51 are complemented immediately upstream by a series of circumferentially spaced stators 73 and immediately downstream by a series of circumferentially spaced stators 74. Stators 73 are secured at their radially outer ends to ring member 42 and at their radially inner ends to a ring member 75. Ring member 75 includes a flange portion 74A which sealingly engages a labrinth seal 76 clamped between fan portion 50B and compressor portion 51C. Stators 74 are secured at their radially outer ends to a member 77 which extends forwardly from interstage member 20 in nesting relation with ring member 42. The radially inner ends of stators 74 are secured to a ring member 78.

Spinner 52 is secured to spider 84 by bolts 86 and spider 84 is in turn secured to a flange 50B on the forward end of hub 50 by bolts 88 and 90. A seal plug 92 is pressed into the open forward end of shaft 48 and held in position by a cap 94 secured to spider 84 and flange 50B by bolts 90.

Low pressure turbine assembly 54 comprises a first stage axial turbine member 92, a second stage axial turbine member 94, a labyrinth seal member 96 and a mounting member 98.

First stage axial turbine member 92 includes a main body portion 92A, a plurality of circumferentially spaced blade portions 92B and a mounting flange portion 92C. Second stage axial turbine member 94 includes a main body portion 94A, a plurality of circumferentially spaced blade portions 94B and a mounting flange portion 94C. Labyrinth seal member 96 includes a mounting flange portion 96A and a seal portion 96B. A stator ring 99 provides a series of circumferentially spaced stator portions 99A between turbine blade portions 92B and 94B. The radially inner periphery 99B of stator ring 99 sealingly coacts with seal portion 96B of seal member 96. Mounting member 98 includes a hub portion 98A splined on the aft end of shaft 48 and a flange portion 98B. Flange portions 92C, 94C, 96A and 98B are secured together in sandwhich fashion by a series of circumferentially spaced bolts 100. A spanner nut 102 on the aft end of shaft 48 snugs up mounting member hub portion 98A and a spacer 104 and presses the inner race of bearing 60 against a shoulder 48B on shaft 48. An annular tapered seal housing member 106 is secured at its forward annular end to bearing housing member 70 and carries a ring seal 108 at its aft end. Ring seal 108 sealingly engages the outer peripheral surface of mounting member hub portion 98A.

High pressure spool assembly 14 includes a quill shaft 110, a single stage high pressure centrifugal compressor 112 and a single stage high pressure axial turbine 114.

Quill shaft 110 is telescopically received over shaft 48 and is journaled on a forward ball bearing 116 and an aft roller bearing 118. Forward bearing 116 is supported by a bracket 120 secured by bolts 122 to interstage member 20. A carbon face seal assembly 124 is supported on an annular surface 20B of interstage member 20 immediately aft of bearing 116. Seal assembly 124 sealingly coacts with a face seal runner 126 on shaft 110. Seal assemblies 67 and 124 respectively seal the forward and aft ends of the forward bearing cavity 128 in which bearings 56, 58 and 116 are disposed. Lubricating oil is supplied to and scavenged from forward bearing cavity 128 by a series of interconnected cored or drilled passages in interstage member 20, in a ring manifold 129 secured by bolts 130 to the aft face of interstage member 20, in a ring manifold 132 secured by bolts 134 to bearing support member 64, and in bearing housing member 62.

A bevel gear 136 is positioned on shaft 110 immediately forwardly of the inner race of bearing 116. A spanner nut 138 on the forward end of shaft 110 snugs up gear 136, the inner race of bearing 116 and face seal runner 126 and presses a spacer 140 against a shoulder 110A on shaft 110.

Bevel gear 136 engages another bevel gear 142 journaled in a bearing 144 supported in forward bearing cavity 128. Gear 142 in turn drives an accessory drive quill 146 which passes downwardly through a cored passage 20C in interstage member 20 for engagement with another bevel gear 148 journaled in a bearing 150 supported in an accessory drive gearbox housing 152. Bevel gear 148 drives other gearing to power various accessory items of the engine.

Centrifugal compressor 112 includes a hub portion 112A, a main body portion 112B and vane portions 112C. Turbine 114 includes a hub portion 114A, a main body portion 114B and vane portions 114C. Compressor 112 and turbine 114 are splined onto shaft 110 in generally forward and aft positions, respectively, with an annular, rotary fuel slinger 154 positioned between the hub portions 112A and 114A of the compressor and turbine. A seal assembly 156 is secured to bearing support member 70 for sealing engagement with a seal runner 158 carried on shaft 110. A spanner nut 160 snugs up seal runner 158, turbine hub portion 114A and fuel slinger 154 and presses compressor hub portion 112A against a shoulder 110B on shaft 110. Another spanner nut 161 presses the inner race of bearing 118 against nut 160.

High pressure spool assembly 14 also includes a labyrinth seal member 162 carried on the forward end of turbine hub portion 114 and another labyrinth seal member 163 carried on the aft end of compressor hub portion 112A.

Seal assemblies 156 and 108 respectively seal the forward and aft ends of the rear bearing cavity 164 in which bearings 118 and 60 are disposed. Lubricating oil is supplied to and scavenged from rear cavity 164 by series of cored or drilled passages in interstage member 20, in ring manifold 129 and in bearing support member 70, and by a pair of horizontal tubed sections 166 which are joined, respectively, to a pair of vertical tubed sections 168 to provide intercommunication between interstage member 20 and bearing support member 70. Oil is supplied to cavity 164 through the upper tubed section 168 and scavenged from cavity 164 through the lower tubed section 168. Forward bearing cavity 128 and rear bearing cavity 164 are interconnected by the annular space between shafts 48 and 110 to allow flow of air and lubricant between the cavities.

Burner 16 is positioned generally between compressor 112 and turbine 114 and comprises a series of annular sections 16A welded together to form a composite annular structure comprising the main body or combustion section of the burner. A series of holes 16B in the sections 16A allow entry of compressor air to the interior of the combustion section of the burner. Burner 16 also includes an annular exit section 16C containing guide vanes 16D. The fore and aft portions of the combustion section of the burner are spaced axially apart at their radially inner peripheries to define an annular opening 16F into which slinger 154 projects. Exit section 16C communicates at its forward end with the radially outermost peripheral portion of the combustion section of the burner and extends rearwardly and radially inwardly in a smooth arc to a location immediately forwardly of the vane portions 114C of high pressure turbine 114. A ring member 169 is secured to the aft end of burner section 16C and sealingly engages labyrinth seal member 162 on the high pressure spool assembly.

A fuel delivery fitting 170 extends through the outer and inner bypass ducts for connection with a curved tubed section 172 which in turn connects to a fuel delivery member 174. Member 174 sealingly engages labyrinth seal member 163 and includes cored passages which direct the fuel directly into the crook of the slinger for delivery into the interior of burner 16. An igniter 176 extends through the outer and inner bypass ducts with its tip 176A positioned in a tubular fitting portion 16E of burner 16 to provide initial ignition of the fuel and compressed air mixture.

The majority of air entering inlet housing 18 and traversing fan 50 enters and flows through bypass duct 44. However, a minor portion of the entering air, constituting a working airstream 178, enters the annular passage defined between ring members 42 and 75. Airstream 178 traverses stators 73, passes through intermediate pressure compressor 51, traverses stators 74 and enters an annular cored passage 180 in interstage member 20 for delivery to the inlet of high pressure centrifugal compressor 112. After traversing compressor 112, airstream 178 flows through a difuser assembly 182. Difuser assembly 182 is supported by front inner bypass duct 26 and includes a first set of guide vanes 182A and a second set of guide vanes 182B. As the working airstream leaves the annular diffuser discharge 182C, it enters a plenum chamber 184 bounded at its outer periphery by front inner bypass duct 26. From plenum chamber 184, the working airstream enters the interior of the combustion section of burner 16 through holes 16B to support combustion within the combustion section. The heated airstream leaves the combustion section through annular exit section 16C, passing through guide vanes 16D to drivingly impinge on turbine 114. The airstream leaving turbine 114 traverses a duct assembly 186 and passes through guide vanes 186A defined at the discharge end of assembly 186 for driving impingement on first stage turbine 92. The working airstream thereafter traverses stator ring 99, drivingly impinges on second stage turbine 94 and exits the engine through a duct 188 defined by a rear housing assembly 190 and an exhaust cone assembly 192. The airstream exiting duct 188 mixes with the bypass airstream to provide forward engine thrust.

The invention design will be seen to provide a medium bypass turbofan engine that is compact, simple, lightweight, fuel efficient, inexpensive and durable. The invention engine is thus uniquely suitable for use as the power plant in business jet aircraft or pilot training jet aircraft.

While a preferred embodiment of the invention has been illustrated and described in detail, it should be appreciated that the invention is susceptible of modification, without departing from the scope or spirit of the following claims.

We claim:

1. A gas turbine engine of the turbofan type comprising
   A. a generally tubular axially extending housing assembly defining a radially outer annular bypass duct extending from the inlet end of the housing assembly to the exhaust end thereof;
   B. an annular burner positioned within said housing assembly radially inwardly of said bypass duct and concentric to the central axis of the housing assembly;
   C. a low pressure spool assembly including a first shaft journaled on the central axis of the housing assembly, a fan on said first shaft disposed proximate the inlet end of said housing assembly, and a low pressure turbine on said first shaft disposed proximate the exhaust end of said housing assembly; and
   D. a high pressure spool assembly including a hollow second shaft telescopically received over said first shaft, a high pressure compressor on said second shaft positioned between said fan and said burner, a high pressure turbine on said second shaft positioned between said burner and said low pressure turbine, and an annular rotary slinger on said second shaft positioned between said high pressure compressor and said high pressure turbine and arranged to sling fuel radially outwardly into said burner.

2. A gas turbine engine according to claim 1 wherein said burner includes a main body combustion section disposed axially forwardly of said high pressure turbine and including an annular opening at its radially inner periphery through which fuel is delivered by said slinger.

* * * * *